United States Patent [19]
Richter

[11] Patent Number: 5,195,784
[45] Date of Patent: Mar. 23, 1993

[54] METHOD AND MEANS FOR ABSORBING MOVEMENT IN PIPELINES

[76] Inventor: James R. Richter, 848 W. Wisconsin St., Chicago, Ill. 60614

[21] Appl. No.: 565,933

[22] Filed: Aug. 13, 1990

[51] Int. Cl.⁵ ............................................. F16L 51/00
[52] U.S. Cl. ...................................... 285/61; 285/49; 285/115; 285/124; 285/157; 248/55
[58] Field of Search ................... 285/61, 49, 115, 169, 285/157, 124; 248/55

[56] References Cited

U.S. PATENT DOCUMENTS

| | | | |
|---|---|---|---|
| 104,284 | 1/1870 | Donnelly et al. | 248/55 |
| 411,518 | 9/1889 | Collis | 248/55 |
| 700,378 | 5/1902 | Schmidt | 285/64 |
| 2,256,388 | 9/1941 | Fentress | 285/61 |
| 2,511,335 | 6/1950 | Guarnaschelli | 285/61 X |
| 3,375,045 | 4/1965 | Zeidler | 248/55 |
| 4,002,357 | 1/1977 | Bennett | 285/61 |
| 4,244,543 | 1/1981 | Ericson | 248/55 |
| 4,295,667 | 10/1981 | Zahs et al. | 285/157 X |

OTHER PUBLICATIONS

*Steam Power Plant Engineering,* Gebhardt, G. F., 5th Edition, pp. 728-731, and 739.

*Primary Examiner*—Eric K. Nicholson
*Assistant Examiner*—Heather Chun
*Attorney, Agent, or Firm*—Hill, Steadman & Simpson

[57] ABSTRACT

A method and a device for absorbing movement in pipe lines comprising an expansion loop system wherein the expansion loop system will absorb axial movement of the pipe without imparting thrust loads to the pipe. The system includes an anchor, a pipe guide for guiding the pipe along a longitudinal axis and an expansion loop member attached along the length of the pipe at severed central open ends of the pipe. The expansion loop member comprises a pair of 90° elbow connectors, a 180° bend return member, and a pair of flexible tube members connecting the elbows to the return member. The flexible tube members accommodate the axial movement of the pipe.

6 Claims, 1 Drawing Sheet

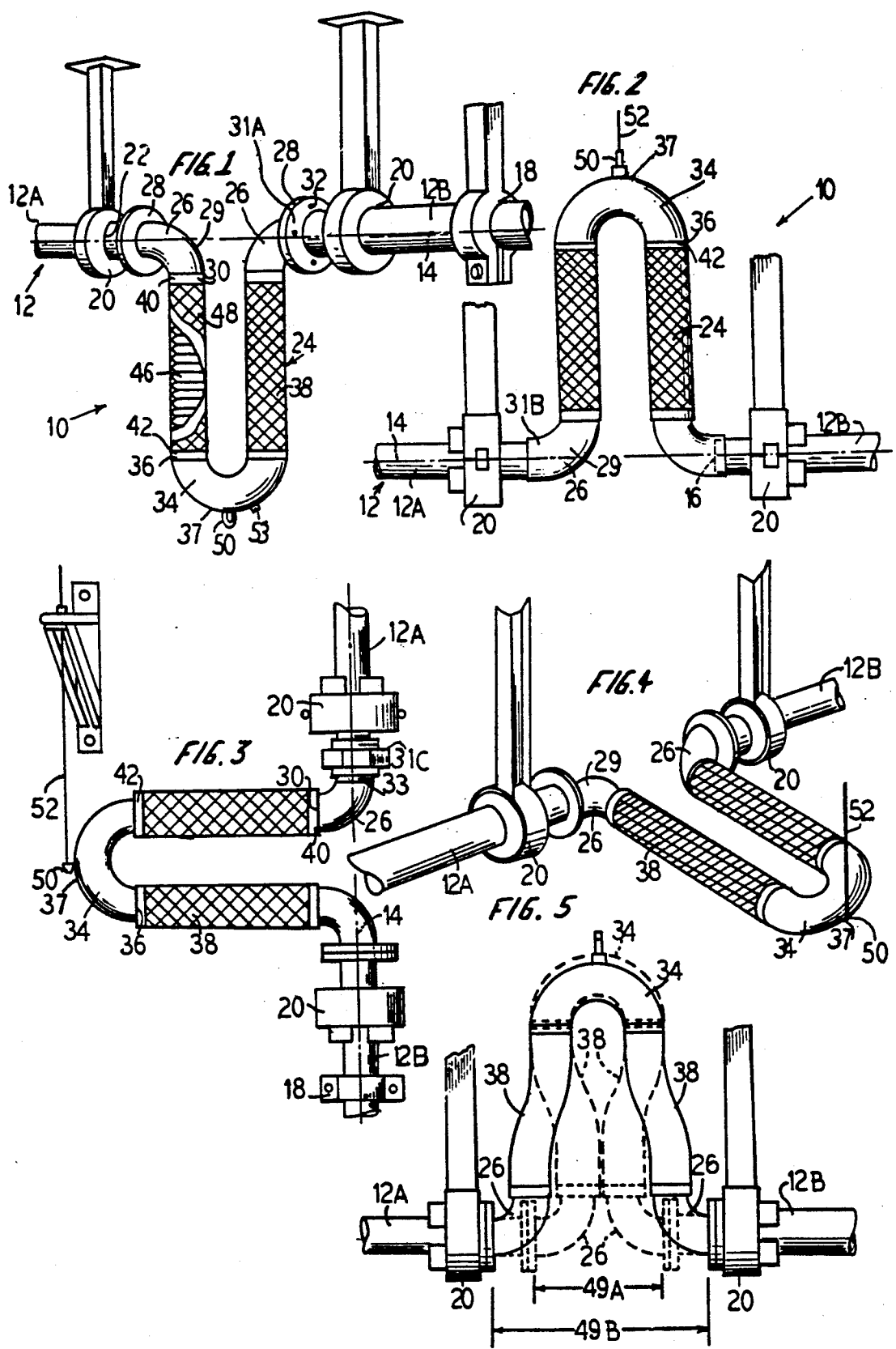

METHOD AND MEANS FOR ABSORBING MOVEMENT IN PIPELINES

BACKGROUND OF THE INVENTION

The invention relates to methods and devices for absorbing movement in runs or lines of pipe.

It is a known requirement in the construction of buildings and other areas where runs of pipe are utilized, that there be provided some means of accommodating movement of the pipe, whether due to expansion, contraction, building movement, earthquake, explosion or other factors. What has been provided in the past has included pipe loops wherein the axial pipe run is interrupted by U-shaped loops or bellows-type joints to allow for movement of the pipe. However, the use of such bellows-type joints has required very substantial anchoring of the pipe since the flexing of the joints produces thrust loads. Thus, anchoring thrust blocks, or structural steel has been necessary to accommodate the thrust loads.

Also, the pipe loops previously used to absorb movement in the pipe runs has required a large amount of room for their installation.

SUMMARY OF THE INVENTION

The present invention provides an expansion loop system for use with a pipe extending along a longitudinal axis and divided along its length to form a pair of central open ends, the expansion loop system comprising anchor means for supporting the pipe, pipe guide means for guiding the pipe along the longitudinal axis, and an expansion loop member attached to the pipe at the central open ends, wherein the expansion loop system will absorb axial movement of the pipe without imparting thrust loads to the pipe.

The expansion loop member preferably comprises a pair of elbow connectors each having a first connector end configured to mate with one of the central open ends of the divided pipe and a 90° bend between the connector end and an opposite second end, a return member having a pair of open ends separated by a 180° bend, and a pair of flexible tube members each having one end connected to the second end of the elbow connector and a second end connected to one of the ends of the return member. The flexible tube member preferably comprises an inner corrugated hose and an outer braided cover.

By using an expansion loop member of the preferred type, the required anchors can be considerably smaller than those required by previously available systems. Further, the space required for installation of the present expansion loop system is considerably smaller than that required by previously available systems. By requiring only a fraction of the space of conventional loops, the pipe runs are permitted to run tighter and installation costs are reduced.

BRIEF DESCRIPTION OF THE DRAWINGS

FIG. 1 is a side perspective view, partially cut away, of an expansion loop system embodying the principles of the present invention with the expansion loop positioned in a substantially vertically downwardly depending position.

FIG. 2 is a side elevational view of the expansion loop system of the present invention with the expansion loop mounted in a substantially vertical, upwardly directed position.

FIG. 3 is a side elevational view of the expansion loop system of the present invention with the pipe run being vertical and the expansion loop projecting substantially horizontally.

FIG. 4 is a perspective view of the expansion loop system of the present invention showing a horizontal pipe run and the expansion loop extending substantially horizontally.

FIG. 5 is a side elevational view of the expansion loop system of the present invention showing the range of movement of the expansion loop.

DESCRIPTION OF THE PREFERRED EMBODIMENTS

In FIGS. 1-5, there is illustrated an expansion loop system generally at 10 for use with a pipe 12 extending along a longitudinal axis 14. The pipe 12 is divided along its length to form a pair of central open ends 16. The expansion loop system 10 comprises one or more anchors 18 for supporting the pipe 12. Also, one or more pipe guides 20 are provided which have a central opening 22 therethrough for guiding the pipe 12 along the longitudinal axis 14. Thus, any movement of the pipe 12 will result in a longitudinal axial movement of the pipe 12 through the pipe guide 20. The expansion loop system also comprises an expansion loop member 24 which is attached to the pipe 12 at the central open ends 16.

The expansion loop member 24 is designed to absorb axial movement of the pipe 12 without imparting thrust loads to the pipe. To accomplish this function, in a preferred embodiment, the expansion loop member comprises a pair of elbow connectors 26, each having a first connector end 28 configured to mate with one of the central open ends 16 of the divided pipe 12 and a 90° bend 29 between the connector end 28 and an opposite second end 30. The first connector end 28 can have a flanged end 31A (FIG. 1) for being secured to a flanged open end 16 of the pipe, such as by threaded fasteners 32, can be a female copper sweat connection 31B (FIG. 2) for connecting to copper pipes, can have male threads 33 for being connected to the open end of the pipe, such as by a union connection 31C (FIG. 3), can have an end suitable for welding to the pipe or can have an end with an annular groove formed thereon for receipt of an appropriate connector at the central pipe open end 16. All such types of connections are well known in the plumbing art.

The expansion loop member further comprises a return member 34 which has a pair of open ends 36 separated by a 180° bend 37. Finally, the expansion loop member comprises a pair of flexible tube members 38, each having one end 40 connected to the second end of the elbow connector and a second end 42 connected to one of the ends 36 of the return member 34. In a preferred embodiment, the flexible tube member 38 comprises an inner corrugated hose 46 and an outer braided cover 48 (FIG. 1). By use of such a construction, the flexible tube members will permit and absorb axial movement of the pipe 12 while imparting no thrust load to the pipe.

FIG. 5 illustrates the range of movement of the expansion loop member where it is seen that the flexible tube members 38 permit axially sliding of the pipe through a substantial axial range from a compressed length 49A to an expanded length 49B.

The return member 34 may have a support connection 50 formed thereon which may be utilized when the expansion loop member is secured to the pipe 12 in a position other than a vertical downwardly depending position such as that illustrated in FIG. 1. When the expansion loop member is positioned other than in a vertically downwardly depending position, the return should be vertically supported, such as by a hanger rod 52. The hanger rod should be mounted so as to permit some movement of the return 34 in a direction substantially parallel to the neutral orientation of the flexible tube members 38. As seen in FIG. 5, as the tube members flex between a contracted and expanded position, the return 34 will move in a direction perpendicular to the axis 14 of the pipe 12.

The return member 34 may also include a removable vent or drain plug 53. This plug may be temporarily removed when it is necessary to vent or drain the pipe run.

The present invention also provides a method of installing a pipe to accommodate movement of the pipe comprising installing a first length of pipe 12A along the longitudinal axis 14, installing a second length of pipe 12B along the longitudinal axis 14, spaced from the first length of pipe 12B and then attaching a flexible expansion loop 24 to the facing free ends 16 of each of the lengths of pipe. The first length of pipe 12A should be supported in a pipe guide 20 to permit axial sliding of the pipe in the guide. The first length of pipe 12A should also be secured by an anchor 18 to overcome the frictional forces of the pipe sliding in the pipe guide 20.

When the anchor 18 is attached within four pipe diameters of the flexible expansion loop 24, it is necessary only to install a single pipe guide 20 on the second length of pipe 12B within four diameters of the flexible expansion loop 24 on a pipe guide is not necessary on the first length of pipe 12A. When, however, the first length of pipe 12A is anchored more than four pipe diameters from the flexible expansion loop, then separate pipe guides 20 should be installed within four pipe diameters on each side of the flexible expansion loop 24.

In the preferred embodiment illustrated, the step of attaching a flexible expansion loop comprises positioning the loop such that it projects approximately perpendicular to the longitudinal axis 14. Since the flexible tube members 38 permit axial movement in both directions as shown by FIG. 5, that is, in compression and expansion, the loop may be assembled to the pipes in a position to accommodate either expansion or contraction to a greater degree. For example, the expansion loop can be originally secured to the pipes in a precompressed position 49A or in a preextended position 49B. If the loop is attached in a precompressed position, after installation the loop could be extended to a greater degree than normal. Similarly, if the loop were attached in a preextended position, after installation, the loop could be compressed to a greater degree than normal.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. An expansion loop system for use with a pipe extending along a longitudinal axis and divided along its length to form a pair of central open ends, said pipe being subject to movement along said axis, said expansion loop system comprising:
   an expansion loop member attached to said pipe at said central open end;
   anchor means for supporting said pipe comprising at least one support member being in engagement with said pipe on one side of said expansion loop member;
   pipe guide means for surrounding said pipe comprising at least one guide member with a central opening receiving said pipe through said central opening, said guide member positioned between a support member and said expansion loop member for guiding said pipe along said longitudinal axis;
   said expansion loop member comprising:
      a pair of elbow connectors each having a first connector end configured to mate with one of said central open ends of said divided pipe and a 90° bend between said connector end and an opposite second end,
      a return member having a pair of open ends separated by a 180° bend,
      a support connection formed on said return member at an apex thereof for engagement by a hanger rod to permit movement of said return member in a direction perpendicular to said axis, and
      a pair of flexible tube members each having one end connected to said second end of said elbow connector and a second end connected to one of said ends of said return member;
      said flexible tube members each comprising an inner corrugated hose and an outer braided cover, and
   said expansion loop member lying in a plane containing said axis.

2. An expansion loop member according to claim 1 wherein said return member further has a drain plug formed thereon which may be selectively removable.

3. An expansion loop system for use with a pipe extending along a longitudinal axis and divided along its length to form a pair of central open ends, said pipe being subject to movement along said axis, said expansion loop system comprising:
   an expansion loop member attached to said pipe at said central open end;
   anchor means for supporting said pipe comprising at least one support member being in engagement with said pipe on one side of said expansion loop member;
   pipe guide means for surrounding said pipe comprising at least one guide member with a central opening receiving said pipe through said central opening, said guide member positioned between a support member and said expansion loop member for guiding said pipe along said longitudinal axis;
   said expansion loop member comprising:
      a pair of elbow connectors each having a first connector end configured to mate with one of said central open ends of said divided pipe and a 90° bend between said connector end and an opposite second end,
      a return member having a pair of open ends separated by a 180° bend, and a support connection formed thereon at an apex thereof for engagement by a hanger rod to permit movement of said return member in a direction perpendicular to said axis, a pair of flexible tube members each having one end connected to said second end of said elbow connector and a second end connected to one of said ends of said return member;

said flexible tube members each comprising an inner corrugated hose and an outer braided cover, and said expansion loop member lying in a plane containing said axis.

4. An expansion loop member according to claim 3 wherein said return member further has a drain plug formed thereon which may be selectively removable.

5. An expansion loop member for use with a pipe extending along a longitudinal axis and divided along its length to form a pair of central open ends, said pipe being subject to movement along said axis and being supported for movement only along said axis, said expansion loop member comprising:

a pair of elbow connectors each having a first connector end configured to mate with one of said open ends of said divided pipe and a 90° bend between said connector end and an opposite second end, a return member having a pair of open ends separated by a 180° bend, a support connection formed on said return member at an apex thereof for engagement by a hanger rod to permit movement of said return member in a direction perpendicular to said axis, and a pair of flexible tube members each having one end connected to said second end of said elbow connector and a second end connected to one of said ends of said return member;

said flexible tube members each comprising an inner corrugated hose and an outer braided cover, and said elbow connectors, return member and tube members lie in a common plane with said pipe axis.

6. An expansion loop member according to claim 5 wherein said return member further has a drain plug formed thereon which may be selectively removable.

* * * * *

UNITED STATES PATENT AND TRADEMARK OFFICE
CERTIFICATE OF CORRECTION

PATENT NO. :  5,195,784
DATED      :  March 23, 1993
INVENTOR(S):  James R. Richter It is certified that error appears in the above-indentified patent and that said Letters Patent is hereby corrected as shown below:

On the title page, Item [73]:
 Assignee:  Metraflex Company
            Chicago, Illinois 60612

Signed and Sealed this

Twenty-second Day of March, 1994

*Attest:*

BRUCE LEHMAN

*Attesting Officer*         *Commissioner of Patents and Trademarks*